United States Patent [19]

Asano

[11] 4,206,928
[45] Jun. 10, 1980

[54] SYSTEM FOR RECIRCULATING SEALING LIQUID IN A STIRLING ENGINE

[75] Inventor: Kenji Asano, Ageo, Japan

[73] Assignee: Nippon Piston Ring Co., Ltd., Tokyo, Japan

[21] Appl. No.: 939,619

[22] Filed: Sep. 5, 1978

[30] Foreign Application Priority Data

Sep. 10, 1977 [JP] Japan .............................. 52-109086

[51] Int. Cl.² ............................................. F16J 15/40
[52] U.S. Cl. ......................................... 277/15; 277/3; 277/17; 277/28; 92/86
[58] Field of Search .................... 277/1, 3, 15, 27, 28, 277/17, 18; 92/86; 415/110–113

[56] References Cited

U.S. PATENT DOCUMENTS

| 3,568,436 | 3/1971 | Heffner et al. | 277/28 X |
| 4,058,320 | 11/1977 | Kosanovich | 277/3 |
| 4,093,239 | 6/1978 | Sugahara | 277/28 X |
| 4,121,839 | 10/1978 | Takano et al. | 277/3 |

FOREIGN PATENT DOCUMENTS

| 253086 | 11/1926 | United Kingdom | 277/15 |
| 826197 | 12/1959 | United Kingdom | 277/27 |

Primary Examiner—Robert S. Ward, Jr.
Attorney, Agent, or Firm—Sughrue, Rothwell, Mion, Zinn and Macpeak

[57] ABSTRACT

A system for recirculating sealing liquid back into the liquid seal portion of a Stirling engine is disclosed. The system uses two pumping devices alternatively coupled to an accumulation reservoir to receive escaped liquid and to return it to the liquid seal. As sealing liquid accumulates, it is selectively pumped into one pumping device, while the other is discharging previously accumulated liquid. The system is then switched so that the operation of the two pumping devices is reversed.

12 Claims, 2 Drawing Figures

SYSTEM FOR RECIRCULATING SEALING LIQUID IN A STIRLING ENGINE

BACKGROUND OF THE INVENTION

This invention relates to a system for recirculating sealing liquid that has leaked from a liquid seal portion of a Stirling engine back into the liquid seal portion.

Stirling engines have received increasing attention in recent years owing to their high torque characteristics, clean exhaust gases, low noise, low fuel expense, low maintenance, and high durability when compared with a conventional gasoline engine. Furthermore, the thermal efficiency of a Stirling engine is equal or superior to that of the internal combustion engine because in a Stirling engine hydrogen or helium is used as the working fluid instead of air, and hence the temperature efficiency of the thermal heat exchangers is greatly improved.

However, since hydrogen or helium as the working fluid has a relatively small molecular structure, it is difficult to properly seal a Stirling engine. Stirling engines have accordingly exhibited high leakage rates in the sealing area between the cylinder wall and the piston rod. Conventional "roll sox" seals have been reasonably effective but their durability is low due to the choice of materials used therein.

Recently, multiple seal rings have been used to form a compound seal with a block seal portion and a liquid seal portion positioned therebelow in order to enhance durability.

However, the problem of leakage of the sealing liquid used in the liquid seal portion has remained, and research to solve this problem has not defined a suitable mechanism therefor. Hence, the problem of leakage remains and an effective engine must take such leakage into account.

SUMMARY OF THE INVENTION

It is therefore an object of this invention to provide a recirculation system for handling sealing liquid that leaks out of the liquid seal portion of the compound seal.

Briefly, and in accordance with the present invention, a pair of pumping devices are provided each having a cylinder and piston which divides each cylinder into two chambers. One of the chambers of each of the pumping devices is provided with a spring, and working gas leaking from the block seal portion is introduced thereinto, while the second chamber of each of the pumping devices selectively communicates with a liquid tank into which sealing liquid that has leaked is accumulated. The liquid seal portion communication is established with an electromagnetic valve actuated by a signal from the second chamber; hence sealing liquid that has leaked is introduced into one of the second chambers while sealing liquid contained in the other of the second chambers is returned into the liquid seal portion.

It is an object of this invention to provide a system that recirculates sealing liquid back into the liquid seal portion of a compound seal for a Stirling Engine.

It is another object of this invention to provide a devices that is more efficient than prior art device and improves the commercial utility of a Stirling engine.

These and other objects of this invention will become apparent from the description of the drawings and the preferred embodiment which follow.

DETAILED DESCRIPTION OF THE INVENTION

Figure 1:
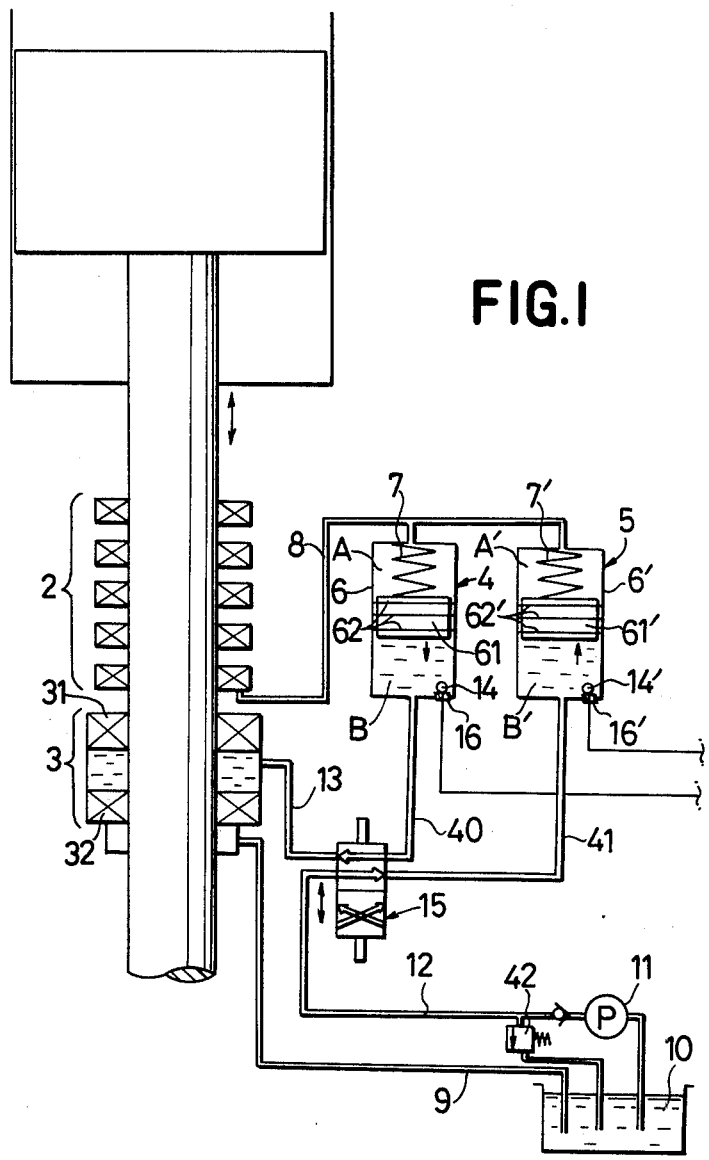
FIG. 1 is a schematic view showing a system for recirculating sealing liquid that has leaked back into the liquid seal portion for use in a Stirling engine according to the present invention.

Referring now to the drawings, and initially to FIG. 1, reference numeral 2 designates a block seal portion for preventing leakage of the working fluid, typically hydrogen or helium numeral 3 a liquid seal portion disposed below the block seal portion 2, and 31, 32 seal elements for sealing the sealing liquid. The sealing liquid is a common type of oil or other well known sealing oil. Reference numerals 4 and 5 denote a first and a second piston type pumping devices, respectively.

The first and the second pumping devices 4 and 5 are provided with pistons 61, 61' respectively in cylinders 6, 6' to divide the same into two chambers, A, B and A', B', respectively. The chambers A, A' are provided with springs 7, 7', respectively and working fluid is introduced in the chambers through a pipe 8. The chambers B, B' are adapted to receive and discharge sealing liquid that has leaked from the liquid seal portion 3. As shown in FIG. 1, the sealing liquid escaping from the liquid seal portion 3 is accumulated in a tank 10 through a pipe 9, and the accumulated liquid is introduced into the chambers B, B' by the energization of an electromagnetic valve 15 by actuation of contacts 14, 14' provided in the chambers B, B' through a pipe 40 and a pipe 41. For purposes of clarity, the electrical contacts to the valve are shown in FIG. 2. Liquid may be introduced into chamber B, B' on an alternative basis or by selective switching of the valve 15.

The pipe 12 is adapted to introduce leaked sealing liquid from the tank 10 to either the chamber B or B' by a pump 11 through valve 15 to lines 40 or 41. The pipe 13 is adapted to discharge the same from either the chambers B or B' to the liquid seal portion 3.

Figure 2:
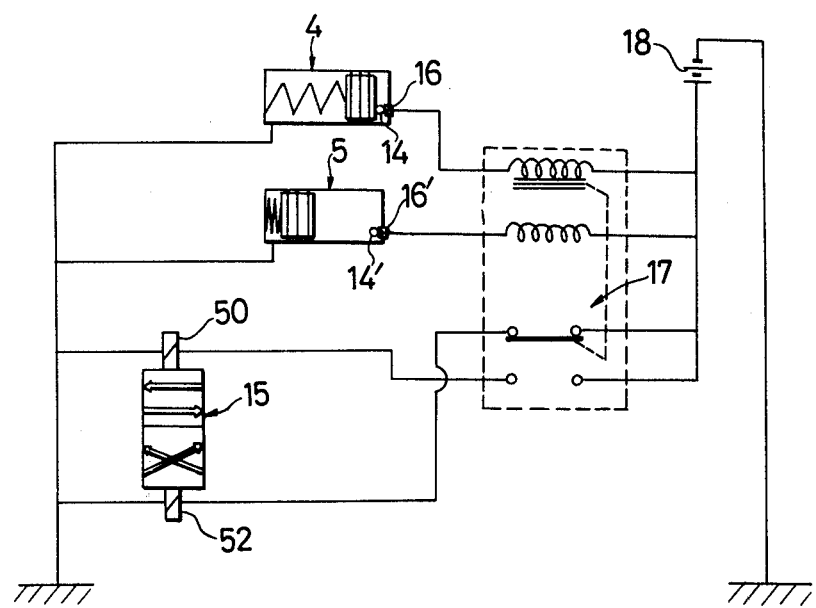
FIG. 2 shows an electrical circuit to actuate an electromagnetic valve according to the present invention.

FIG. 2 shows an electric circuit used to actuate the contacts 14, 14' and the electromagnetic valve 15 shown in FIG. 1. The valve is schematically shown in FIG. 1. Essentially it performs two coupling functions. In a first position input line 12 is coupled to line 41 and discharge line 13 is coupled to line 40. This is shown in FIG. 1. In a second coupling the valve would shift to perform the cross coupling as diagramatically shown where input line 12 would be coupled to line 40 and output 13 coupled to line 41. Such valves are well known in the art and are readily available on a commercial basis. One of electrodes 50 of the electromagnetic valve 15 is electrically coupled to the first and the second pumping devices 4, 5. In the first and the second pumping devices 4 and 5, at least one of the seal rings 62, 62', respectively, is a metallic, electrically conductive seal ring, so that the piston forms part of the electrode. The contacts 14, 14' are insulated from the chambers B, B' by insulators 16, 16', respectively to block the electrical conduction between the contacts and the cylinders 6, 6'. The contacts 14, 14' are connected to the electromagnetic valve 15 through a keep relay 17 coupled to electrode 52. The reference numeral 18 designates an electric source for the relay.

In operation, sealing liquid that has leaked is supplied into the chamber B' of the second pumping means 5 by the pump 11 as shown in FIG. 1. Simultaneously, pre-introduced leaked liquid into the chamber B of the first pumping means 4 is discharged into the liquid seal portion 3 by the biasing force of the spring 7 and the leaked working gas pressure in the chamber A. When the leaked sealing liquid in the chamber B is completely discharged, that is, when the piston 6 reaches the bottom dead center, the contact 14 is actuated to actuate the electromagnetic valve 15 by the keep relay 17. The valve position shifts as shown schematically in FIG. 1. Thus, the pipe 12 is connected to line 40 to introduce the subsequent liquid that has leaked into the chamber B and the pipe 13 is connected to a line 41 to discharge the liquid from the chamber B'.

When the leaked liquid is completely discharged from the chamber B' namely, when the piston 61' reaches bottom dead center, the contact 14' is actuated to switch the electromagnetic valve to the original state as shown in FIG. 1. These operations are repeatedly carried out so as to continuously return leaked sealing liquid into the liquid seal portion 3.

Alternatively, proximity switches can be used as the electrical contacts. Further, it is preferable to provide a circuit to terminate action of pump 11 when the leaked liquid has filled either the first or second pumping devices. In that regard, a bypass circuit 42 is provided to recirculate the liquid back into the reservoir 10 when the leaked liquid has filled with either first or second pumping means.

It is apparent that other modifications are possible without departing from the essential scope of this invention.

I claim:

1. A system for recirculating sealing liquid escaping from a single liquid seal comprising:
    first and second pumping means, said pumping means having respective lines to a chamber therein,
    a reservoir of sealing liquid accumulated from leakage of said liquid seal, and
    valve means for selectively coupling only one of said pumping means to said reservoir through one of said lines while simultaneously coupling only the other of said pumping means to said liquid seal through the other of said lines.

2. The system of claim 1 wherein said liquid seal is a portion of a multiple seal ring in a Stirling engine, further comprising a coupling between said multiple seal and said reservoir to accumulate in said reservoir sealing fluid leaking from said liquid seal.

3. The system of claim 1 wherein said first and second pumping means comprise cylinders having piston elements therein, said piston elements dividing said chambers into first and second compartments, said lines coupling said second compartments to said valve means.

4. The system of claim 3 wherein said first compartments each include biasing means to urge said pistons toward said second compartment, and respective inlets to supply a supply of working fluid into said first compartments.

5. The system of claim 3 further comprising control means for actuating said valve.

6. The system of claim 5 wherein said control means comprises sensor means disposed in said second compartments to determine when said piston elements have reached a predetermined limit of travel and relay means responsive to said sensor means to selectively switch the position of said valve.

7. The system of claim 1 further comprising a supply pump for pumping sealing liquid from said reservoir to said valve means.

8. The system of claim 7 further comprising limit means to sense when said second compartments have been filled with sealing liquid.

9. The system of claim 1 further comprising means to switch said valve means to reverse the coupling of said first and second pumping means to said reservoir and said liquid seal.

10. The system of claim 9 wherein said means to switch comprises sensor means in said first and second pumping means to determine when sealing liquid has been pumped from a respective chamber thereof, and relay means responsive to said sensor means to switch said valve means.

11. In a sealing arrangement for the working fluid of a Stirling engine or the like including a working cylinder containing the working fluid, a reciprocating working piston in the cylinder, an axially reciprocable piston rod connected to said piston and extending out of a cylinder opening, block seal means surrounding the piston rod below the cylinder opening for preventing leakage of the working fluid from the working cylinder, and liquid seal means surrounding said piston rod below the block seal means for sealing working fluid leaked from the block seal means, an improved system for recirculating leaked sealing liquid to the liquid seal means and comprising:
    first and second pumping means each having an upper chamber and a lower chamber and containing a reciprocable piston between the upper and lower chambers;
    first conduit means for supplying to both of said upper chambers the working fluid leaked from said block seal means so that the pistons are biased toward the lower chambers by the pressure of the leaked working fluid;
    a reservoir for accumulating sealing liquid leaked from said liquid seal means;
    second conduit means for supplying sealing liquid to said liquid seal means;
    third and fourth conduit means communicating with the lower chambers of said first and second pumping means, respectively; and
    controllable valve means coupled between said third and fourth conduit means and said reservoir and said second conduit means, said valve means being selectively reversible between a first position and a second position: in said second position said valve means connecting said third conduit means to said reservoir to supply the accumulated sealing liquid to the lower chamber of said first pumping means, while simultaneously connecting said fourth conduit means to said second conduit means for supplying the sealing liquid in the lower chamber of said second pumping means to said liquid seal means; and in said second position said valve means connecting said fourth conduit means to said reservoir to supply the accumulated sealing liquid to the lower chamber of said second pumping means, while simultaneously connecting said third conduit means to said second conduit means for supplying the sealing liquid in the lower chamber of said first pumping means to said liquid seal means.

12. The system of claim 11 further comprising control means for switching said controllable valve means between said first and second positions, said control means comprising piston position sensing means in the lower chambers of said first and second pumping means for sensing a predetermined limit of travel for each of the pistons in said first and second pumping means whereby said control means switches said valve means between the two valve positions when one of said pistons has reached said predetermined limit of travel.

* * * * *